United States Patent

Asahara et al.

[11] Patent Number: 5,962,823
[45] Date of Patent: Oct. 5, 1999

[54] NOISE INSULATING WALL STRUCTURE

[75] Inventors: Yasuyuki Asahara, Yokosuka; Keijiro Iwao, Yokohama, both of Japan

[73] Assignee: Nissan Motor Co., Ltd., Kanagawa-ken, Japan

[21] Appl. No.: 08/649,968

[22] Filed: May 15, 1996

[30] Foreign Application Priority Data

May 17, 1995 [JP] Japan .................................. 7-118566

[51] Int. Cl.⁶ ........................................................ E04B 1/82
[52] U.S. Cl. ............................................ 181/286; 181/292
[58] Field of Search ..................................... 181/210, 213, 181/224, 286, 288, 290, 292, 293, 295

[56] References Cited

U.S. PATENT DOCUMENTS 3,819,007  6/1974  Wirt et al. ................................ 181/292
4,231,447  11/1980  Chapman ............................ 181/286 X
5,543,198  8/1996  Wilson ................................ 181/292 X

FOREIGN PATENT DOCUMENTS 44 09 200 A1  9/1994  Germany .
7-175485  7/1995  Japan .
2 276 224  9/1994  United Kingdom .

*Primary Examiner*—Khanh Dang
*Attorney, Agent, or Firm*—McDermott, Will & Emery

[57] ABSTRACT

A noise insulating wall structure includes tubular extensions which extend into a space defined between spaced insulating plates. The extensions formed on the lower of the two plates are formed with openings which allow water, which accidentally finds its way into the interior of the panel, to drain out and thus not effect the sound attenuating performance of panel. The drain openings have an area which is determined based on a ratio of the area of the opening to the total circumferential area (including the area of the opening) of the extension.

19 Claims, 11 Drawing Sheets

DETERIORATION OF NOISE INSULATING PERFORMANCE IN A CASE WHERE WATER IS COLLECTED IN NOISE INSULATING STRUCTURE

DETERIORATION OF NOISE INSULATING PERFORMANCE IN A CASE WHERE OPENING IS PROVIDED FOR NOISE INSULATING PLATE

NOISE INSULATING WALL STRUCTURE

BACKGROUND OF THE INVENTION

1. Field of the Invention

The present invention relates to a noise insulating wall structure, and more specifically relates to a noise insulating wall structure which is able to exhibit a noise insulating effect while maintaining gas permeability, and is particularly suitable for an under cover of an automobile.

2. Description of Related Art

Conventionally, as a noise insulating wall structure applied to an automobile, there is an automobile 1 shown in FIGS. 1(a), and 1(b). In the automobile 1, an under cover 5 is attached to a lower portion of the engine room. The under cover 5 functions to enhance the aerodynamic properties of the lower portion of the automobile 1, protect parts in the engine room 3 from impinging pebbles or the like, as well as a function of a noise insulating wall to attenuate noise producted by the automobile. The larger the area of the under cover 5 is, the more effect of the noise insulating wall has.

However, the larger the area of the under cover 5 is made, the more the lower portion of the engine room 3 is sealed, thereby increasing the temperature in the engine room 3. Consequently, the inside of the engine room 3 reaches a high temperature which affects durability of parts. Thus, in the design of the under cover 5 of the engine room 3, not only an aspect of noise control but also that of thermal control must be considered.

The present applicant had already filed an application relating to a noise insulating wall 7 shown in FIGS. 2 and 3 (see Japanese Application No. Hei-5-322041). This noise insulating wall 7 comprises two spaced noise insulating plates 9a and 9b which face each other. By providing hole portions 11a, 11b, 13a and 13b, a cylindrical portion 15 and an extension portion 23 in the noise insulating plates 9a and 9b and the spaced defined therebetween two or more types of vibration systems consisting of an air box and an air spring are formed, whereby transmission sound waves from the respective vibration systems interfere with one another and cancel each other. As a results, the noise insulating effect can be obtained.

Specifically, as shown in FIG. 3, the hole portions 11a and 11b which form a part of the plurality of hole portions 11a, 11b, 13a and 13b, communicate with each other by means of a straight tubular cylinder 15 having substantially the same internal cross-section as that of the respective hole portions 11a and 11b. Accordingly, a continuous hole portion 12 is formed by the hole portions 11a and 11b and the cylinder 15, which extends from the one noise insulating plate to the other. Air 17 in the continuous hole portion 12 acts as an air mass. The continuous hole portions 12 each form a vibration system 19 with one degree of freedom for the mass which receives sound pressure and applies an external force which periodically changes and is thus vibrated.

Further, in the hole portions 13a and 13b which are not communicated with each other by the cylinders 15, cylindrically shaped wall portions 26 protrude inwardly from the opening edge portions of the hole portions 13a and 13b on the opposite sides of the noise insulating plates 9a and 9b to form extensions 23. Thus, extended hole portions 14 and 14 facing each other is formed so as to be longer than the plate thickness of the noise insulating plates 9a and 9b. Further, spaces 16 are formed between the noise insulating plates 9a and 9b and around the extension 23. Air in the extended hole portions 14 and 14 acts as air masses and the air layer in the space 16 acts as an air spring, thereby forming a vibration system 21 with two degrees of freedom.

The above-mentioned vibration system 21 with one degree of freedom has no resonance frequency. An incident wave and a transmitted wave always have the same phase. On the contrary, the vibration system 19 with two degrees of freedom which is formed in the extended hole portions 14 and 14 has only one resonance vibration. In frequency bands which have one or more resonance frequencies, the phase of the incident wave and the phase of the transmitted wave exhibit an antiphase with respect to each other. Therefore, in a frequency band having one or more resonance frequencies in a the vibration system 21 with two degrees of freedom, the wave which passes through the continuous hole portion 12 and the wave which passes through the extended hole portions 14 and the space portion 16 exhibit an antiphase with respect to each other and mutually cancel each other, thereby obtaining the noise insulation effect.

In this case, the mass of the air mass which is defined in the hole portions 13a and 13b can be increased by changing the dimensions of the extensions 23 around the hole portions 13a and 13b. Thus, the resonance frequency for the frequency system 21 with two degrees of freedom can be decreased, and a noise insulating effect over a wider frequency band can be obtained.

In this noise insulating wall, the hole portions 11a, 11b, 13a and 13b are provided for noise insulating plates 29a and 29b. Accordingly, gas permeability can be ensured hot air within the engine room can easily be exhausted. Therefore, according to the thus constructed noise insulating wall, the under cover 5 with both characteristics of gas permeability and noise control can be obtained.

However, when a case where the noise insulating wall structure was actually used as the under cover 5 for an automobile is considered, water 25 can accumulate between the noise insulating plates 9a and 9b to the height of the extension 23 in which the noise insulating plate 9b on the lower side is protruding, by water splashes or the like while driving on a road with puddles, as shown in FIG. 3. In such a case, since the volume of the air layer between the noise insulating plates 9a and 9b is reduced, the air spring constant is increased and the resonance frequency of the vibration system 21 with two degrees of freedom is also increased. When the resonance frequency of the vibration system 21 with two freedom degrees is increased, the frequency band in which the noise insulating effect is narrowed. Accordingly, the noise insulating performance is deteriorated.

The deterioration of the noise insulating performance will be described with reference to FIG. 4. FIG. 4 shows a relationship between each frequency (Hz) for noise insulating walls in various cases, and the transmission loss TL (dB). In FIG. 4, a curve A shows calculated values of transmission loss TL in a case where there is no water between the noise insulating plates 29a and 29b (hereinafter referred to as a case of "no water"). On the other hand, a curve B shows calculated values of transmission loss TL in a case where there is water between the noise insulating plates 29a and 29b (hereinafter referred to as a case of "water existing"). Large transmission loss TL in these curves A and B shows that noises which are transmitted through the noise insulating wall are a little and that the noise insulating effect is large.

Further, a point C in the curve A, where the transmission loss TL is rapidly decreased denotes a resonance frequency for a vibration system 21 with two degrees of freedom in a case of no water, and a point D in the curve B, where the transmission loss TL is rapidly decreased denotes a resonance frequency for a vibration system 21 with two freedom degrees in a case of water existing. Further, a point E in the curves A and B, where the transmission loss TL is rapidly decreased at a frequency higher than the resonance frequency denotes a cavity resonance frequency for the cylinder of the vibration system 19 with one freedom degree, where air acts as the air mass. And, the region ranging from the point C of the resonance frequency for a vibration system 21 with two freedom degrees in a case of no water or the point D of the resonance frequency in a case of water existing, to the point E of the cavity resonance frequency forms a noise insulating region.

When water is collected between the noise insulating plates 29a and 29b, the resonance frequency for the vibration system with two freedom degrees is increased from the point C to the point D, as shown in FIG. 4.

Accordingly, the noise insulating region is changed from between C–E to between D–E, and is narrowed, that is, the noise insulating performance is deteriorated by the decreased region F.

In order to prevent this deterioration it has been proposed to provide the noise insulating plate 9b with a drain hole. However, the control of a mass spring system of both the vibration system 19 with one degree of freedom and the vibration system 21 with two degrees of freedom may become difficult to obtain a sufficient noise insulating performance.

This will be described by use of FIG. 5. FIG. 5 shows a relationship between each frequency (Hz) for noise insulating walls in various cases, and the transmission loss TL (dB). In FIG. 5, a curve G shows calculated values of transmission loss TL in a case where there is no hole in the noise insulating plates 9b, and a curve H shows experimental values of transmission loss TL, in a case where there is no hole in the noise insulating plates 9b. A curve K shows experimental values of transmission loss TL, in a case where there is a hole in the noise insulating plates 9b. In this connection, points L, M and N denote resonance frequencies for the vibration system with two freedom degrees, and a point 0 denotes a resonance frequency for the vibration system with one freedom degree. In this case, a region ranging from the resonance frequency L for the vibration system 21 with two freedom degrees to the resonance frequency 0 for the vibration system 19 with one freedom degree is a noise insulating region.

As shown in FIG. 5, when the curve H is compared with the curve K in a region P between the resonance frequencies L–O, in a case of the curve K, that is, a case where a hole is provided in the noise insulating plate 9b, the transmission loss TL for the vibration system with two degrees is remarkably smaller than in a case of the curve H. Therefore, when a hole is provided in the noise insulating plate 9b, it is necessary to control a vibration system again so that the transmission loss TL is not decreased, and but the control or the like of such vibration system would become difficult.

SUMMARY OF THE INVENTION

With these problems in mind, therefore, it is the object of the present invention to provide a noise insulating wall structure that can discharge water entered into a gap between the noise insulating plates to the external portion, while maintaining the noise insulating performance by an easy control.

To achieve the above-described object, the present invention provides a noise insulating wall structure comprising: at least two noise insulating plates facing to each other with a space, and a plurality of hole portions penetratingly provided in said noise insulating plates and facing to each other, a part of said hole portions being communicated with another part of said hole portions between said noise insulating plates by a straight tubular cylinder portion, and a part of or whole hole portions other than the hole portions communicated by said cylinder portion, having an extension formed by protruding a wall portion from the edge portion of the hole portion to the opposite side of the noise insulating plate, wherein an opening communicating said noise insulating plate with said extension portion is provided for a part of the extension portion of at least said one of noise insulating plates.

It is preferable in the noise insulating wall structure according to the present invention that said opening is provided in the extension portion to be on at least the lowest position side in a state of use.

It is also preferable in the noise insulating wall structure according to the present invention that x exists within the range which is satisfied by the following expression:

$$f > \frac{c}{2\pi}\sqrt{\frac{2\alpha(1-\beta)}{(1-\alpha\beta)(t+h+\delta a)(d-x)}} \quad (1)$$

wherein x is the shortest distance between said opening and the surface of said noise insulating plate;

f is a noise frequency;

c is the speed of sound;

α is an opening ratio of the area of the hole portion to the area of the noise insulating wall;

β is a ratio of the area of the hole portion communicated by the cylinder portion to the area of the whole hole portions;

t is a plate thickness of the noise insulating plate;

h is the length of the protruded extension;

a is the radius of the hole portion;

δ is the compensated value at the edge of the hole portion; and d is the distance between the noise insulating plates.

Further, it is preferable in the noise insulating wall structure according to the present invention that a plurality of openings are provided for each of the extensions.

These openings are preferably arranged so as to face each other.

Further, it is preferable in the noise insulating wall structure according to the present invention that the opening is provided so that the ratio of the area of the opening to the whole circumferential area of the extension including the area of the opening is 20% or less.

It is preferable in the noise insulating wall structure according to the present invention that the opening is a rectangular slit extending along the extension.

Further, it is preferable in the noise insulating wall structure according to the present invention that the opening is formed in a portion ranging from the top end of the extension to the inside of the noise insulating plate.

Further, it is also preferable in the noise insulating wall structure according to the present invention that the opening is formed in a portion ranging from the noise insulating plate to the intermediate portion of the extension.

Further, it is also preferable in the noise insulating wall structure according to the present invention that the noise insulating plate forms at least one part of the under cover of the engine room of the automobile.

According to the present invention, the air layer in the cylinder and the hole portions communicated by the cylinder acts as an air mass, whereby a vibration system with one freedom degree is formed. On the other hand, the air layer in the extension and the hole portion providing the extension acts as an air mass, and the air layer between noise insulating plates acts as an air spring, whereby a vibration system with two freedom degrees is formed. Thus, the transmitted waves from the respective vibration systems are interfered to each other to be canceled and noises which are transmitted through can be insulated.

The noise insulating plate provides a hole portion and the gas permeability can be ensured. Also, hot air between the noise insulating plates is emitted outside.

Any water which has entered between the noise insulating plates from the hole portion is discharged from the extension through an opening. In this case, the opening is not provided in the noise insulating plate, but in the extension. Thus, a sound influence on the above-mentioned vibration system is small. Further, the water which has entered the space between the noise insulating plates is discharged without any complex control of the vibration system.

Further, according to the present invention, the opening is provided in the extension to be on at least the lowest position side in a state of use. Accordingly, the water between the noise insulating plates is collected on the lowest position side and discharged outside from the opening.

Further, according to any present invention, the water between the noise insulating plates through hole portion and the inside of the wall portion is discharged from the opening, when it exceeds the height of distance x from the surface of the noise insulating plate positioned at a lower side.

In this case, since the distance x between the surface of the noise insulating plate and the point nearest thereto is in a range which satisfies the above-mentioned expression (1), with respect to the frequency f of sound for noise insulation, the resonance frequency of the vibration system consisting of an air spring generated by air layer between the noise insulating plates, and an air mass in the extension and the hole portion is smaller than the frequency of sound for noise insulation. Accordingly, the noise insulating performance can be maintained without being deteriorated.

Further, according to the present invention, a plurality of openings are provided in an extension. Thus, water is discharged via the plurality of the openings.

Further, according to the present invention, in a case where a plurality of openings are provided in an extension, the openings are provided at the opposite positions respectively. Thus, when the air layer in the wall portion acts as an air mass, the vibration of the air mass is not one-sided, and an efficient air mass is formed. Namely, when the air in the wall portion is vibrated, it moves while entraining the circumferential air, and when air on an opening side provided on one side is entrained, the gravity center of the air mass is shifted from the center of the wall portion of the extension to the outer circumference of the one side. As a result, deviation in the vibration of the air mass is generated. On the other hand, by providing openings at the opposite sides, the gravity of the air mass is not one-sided but at substantially the center of the wall portion. Thus, deviation in the air mass is not generated.

Further, according to the present invention, any water entering into the space portion between the noise insulating plates from the hole portion of the extension is discharged through the opening. In this case, the opening is provided so that the ratio of the area of the opening to the whole circumferential area of the extension including the area of the opening is 20% or less, whereby the rate of change in the resonance frequency for the vibration system with two freedom degrees consisting of an air spring generated by air layer between the noise insulating plates, is small, and an air mass in the extension and the hole portion becomes small, so that the resonance frequency is not changed at all.

According to the present invention, any water which enters into the space between the noise insulating plates through the hole of the extension, can be discharged through a substantially rectangular slit.

Further, according to the present invention, all of the water entering into the space between the noise insulating plates through the hole of the extension travels on the noise insulating plate and can be discharged outside through the opening.

Furthermore, according to the present invention, the noise insulating wall structure can be used as an under cover of an engine room.

DESCRIPTION OF THE DRAWINGS

The present invention will be disclosed more fully in connection with the accompanying drawings in which.

DETAILED DESCRIPTION OF PREFERRED EMBODIMENTS

Embodiments of the noise insulating wall structure according to the present invention will be described with reference to drawings.

First Embodiment

Figure 1A:
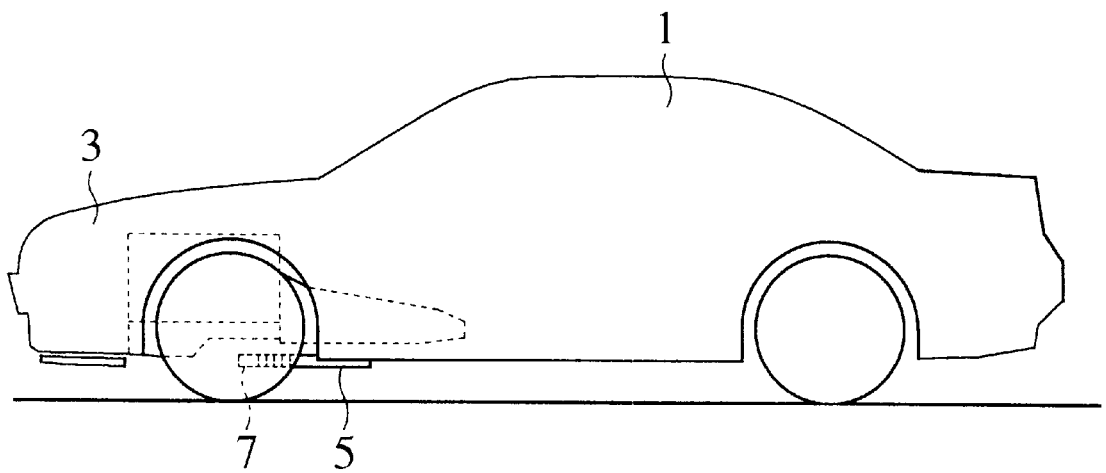
FIGS. 1(a) and 1(b) are a schematic side view of an automobile providing with an under cover, and a schematic bottom view thereof respectively.
Figure 1B:
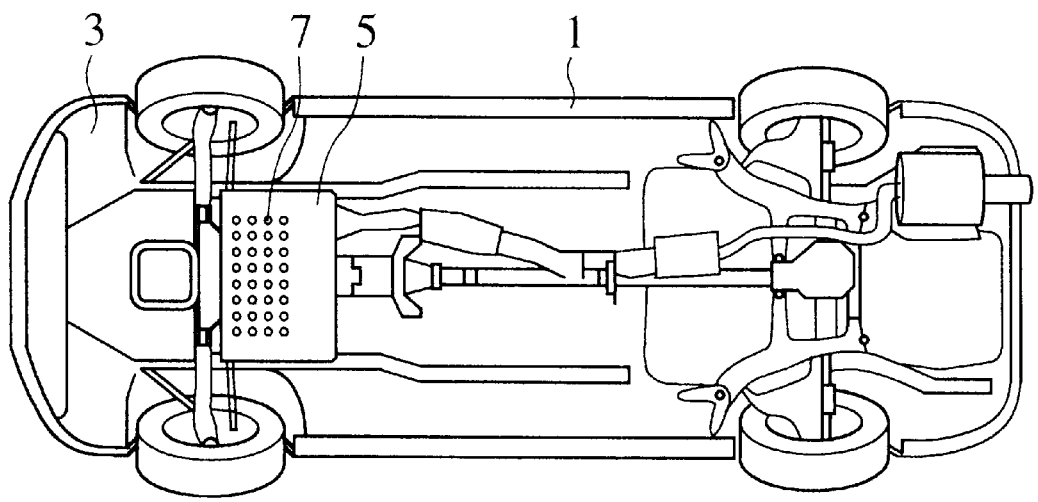
Figure 2:
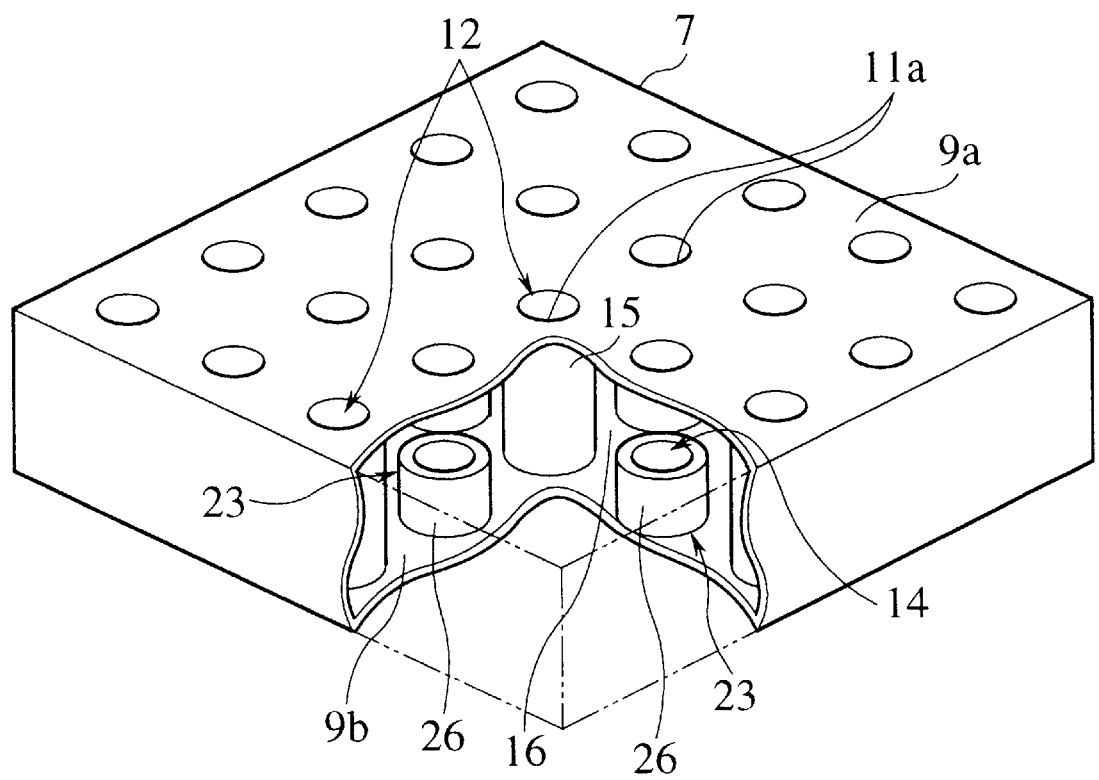
FIG. 2 is a partially cut out perspective view showing a conventional noise insulating wall structure.
Figure 6:
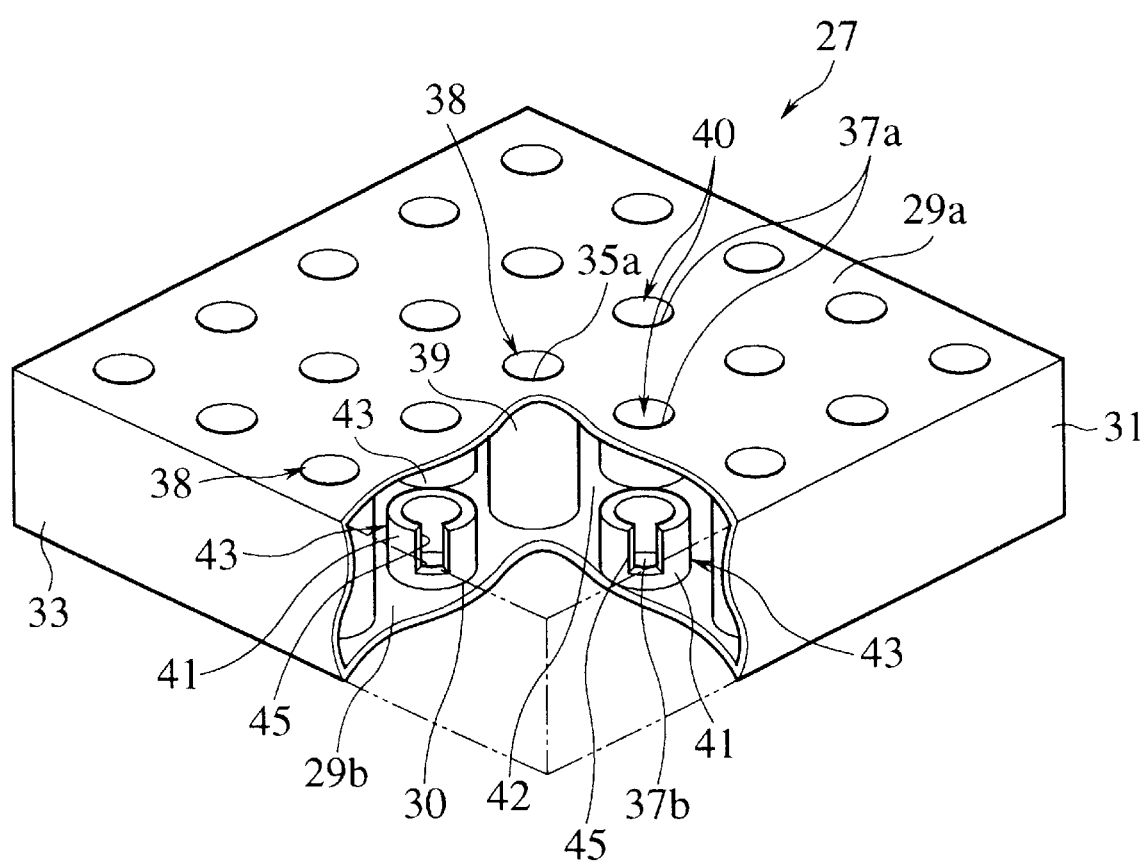
FIG. 6 is a partially cut out perspective view showing a noise insulating wall structure according to a first embodiment of the present invention.
Figure 7:
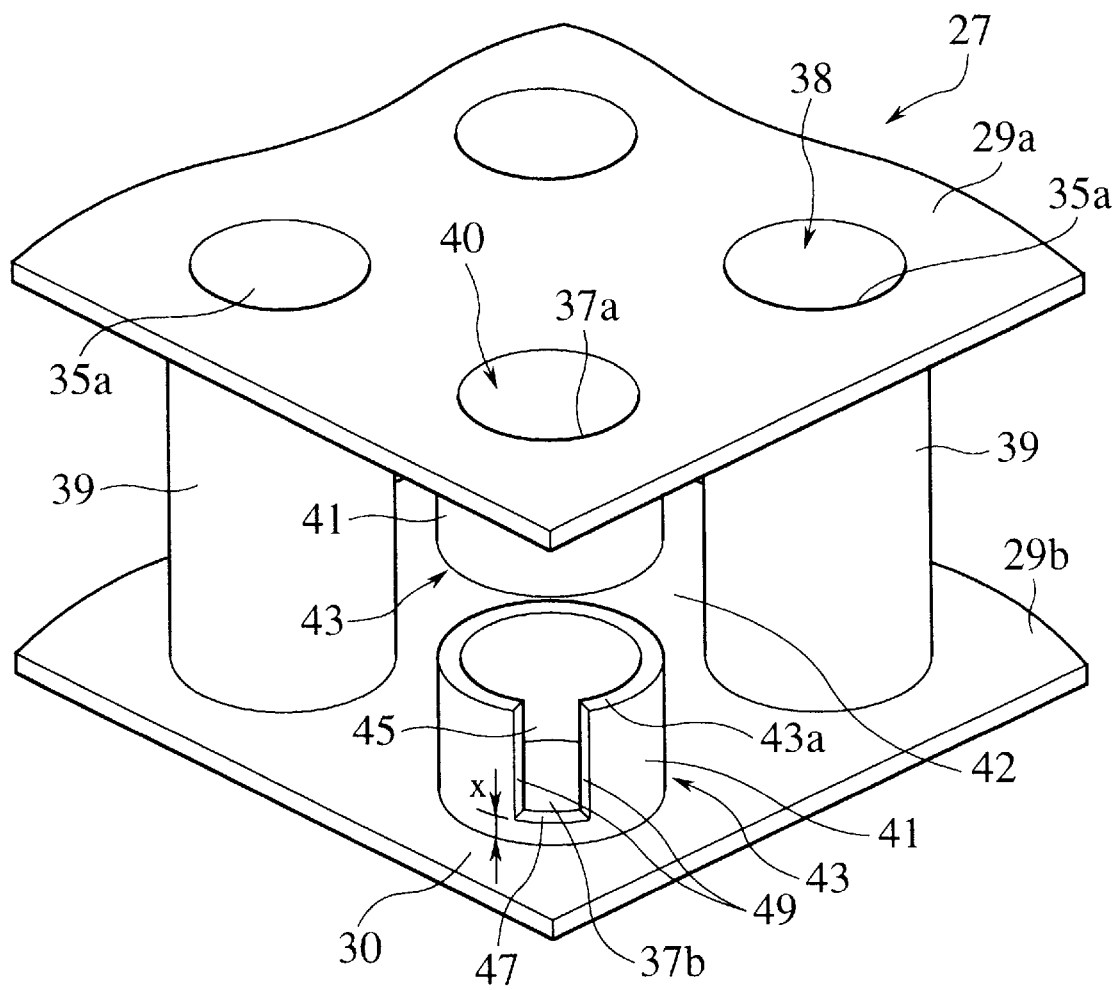
FIG. 7 is a partially enlarged perspective view of the noise insulating wall structure shown in FIG. 6.

In a first embodiment, a noise insulating wall structure has been applied to the under cover 5 of the automobile shown in FIGS. 1(a) and 1(b). That is, the under cover 5 is provided at a lower portion of the engine room, and a noise insulating wall 27 (FIGS. 6 and 7) is integrally provided at the back side thereof. The concrete construction of the noise insulating wall 27 of the first embodiment is shown in FIGS. 6 and 7. FIG. 7 is a partially enlarged view of FIG. 6.

Figure 3:
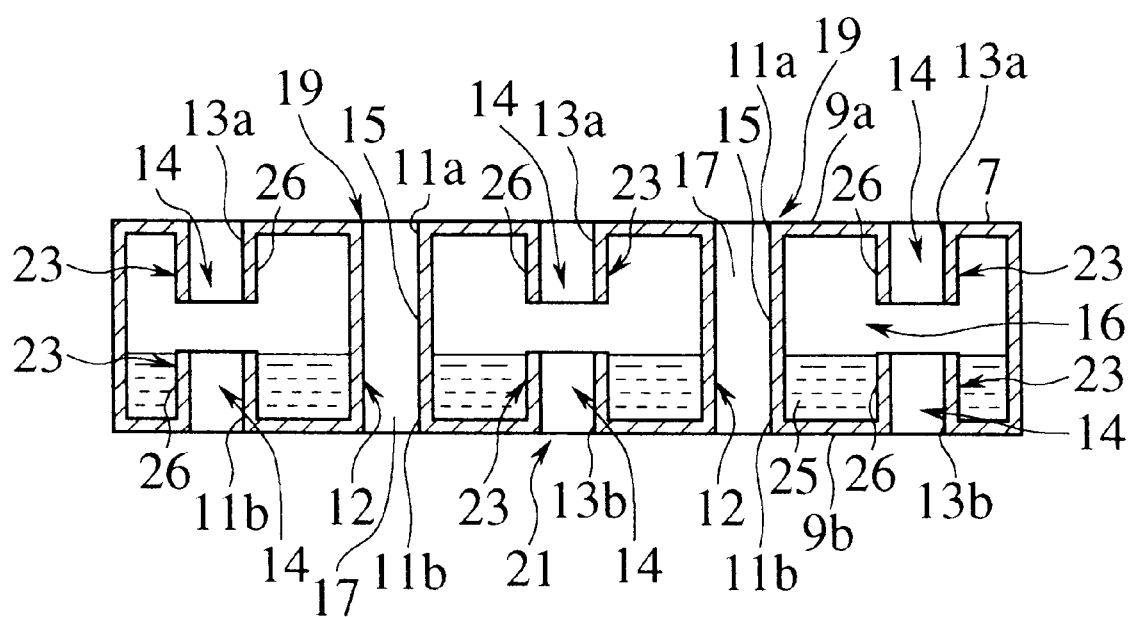
FIG. 3 is a cross-sectional view showing the conventional noise insulating wall structure shown in FIG. 2.
Figure 4:
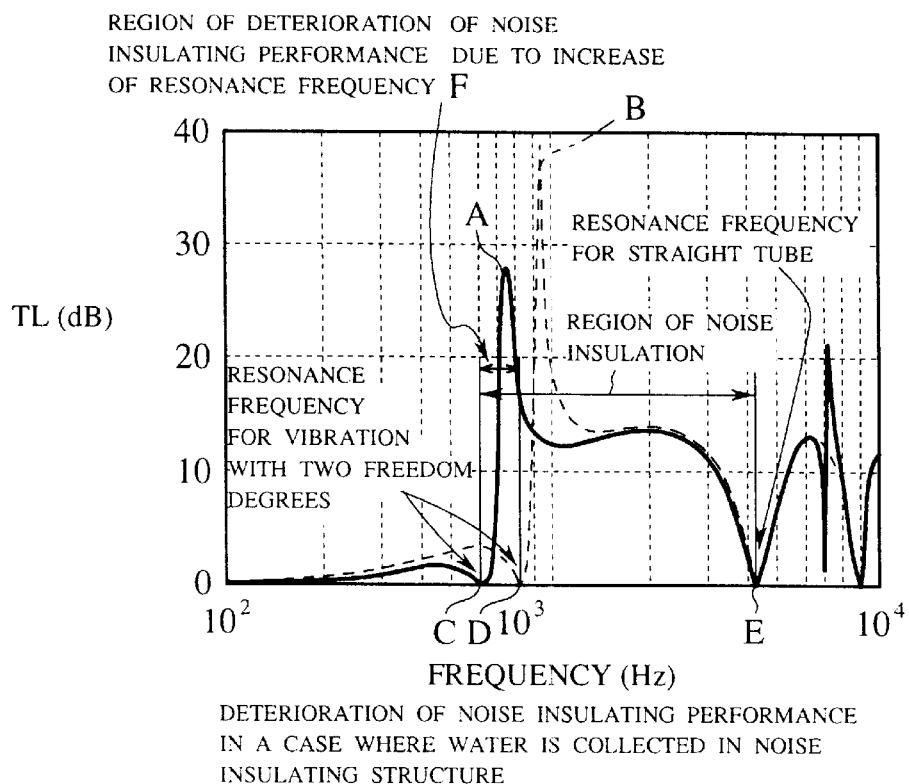
FIG. 4 is a diagram showing transmission losses to frequencies of calculated values in a case where there is no water between noise insulating plates and in a case where there is water therebetween, in the noise insulating wall structure shown in FIG. 2.
Figure 5:
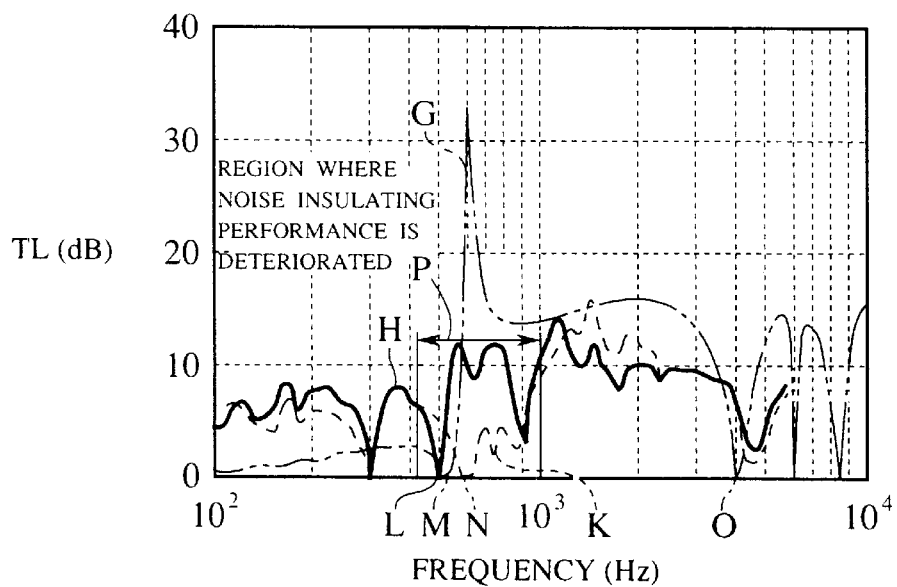
FIG. 5 is a diagram showing transmission losses to frequencies of calculated values in a case where there is an opening in the noise insulating plate and in a case where there is no opening therein, and of experimental value in a case there is an opening in the noise insulating plate, in the noise insulating wall structure shown in FIG. 2.

As shown in FIG. 6, the noise insulating wall 27 has two opposite noise insulating plates 29a and 29b with a space, and forms a box of the noise insulating plates 29a and 29b and respectively opposite side walls 31 and 32. In the two noise insulating plates 29a and 29b are penetratingly provided a plurality of opposite holes 35a, 35b, 37a, and 37b, respectively. The holes 35a and 35b among these holes 35a, 35b, 37a, and 37b are communicated with each other by a straight tubular cylinder 39 between the opposite noise insulating plates 29a and 29b, whereby a straight tubular continuous hole portion 38 is formed, which is defined by the holes 35a and 35b and the cylinder 39, between the noise insulating plates 29a and 29b. The straight tubular continuous hole portion 38 penetrates with a constant cross-section from the outer surface of the one noise insulating plate 29a to the outer surface of the other noise insulating plate 29b. Thus, as described above by using FIG. 3, air in the continuous hole portion 38 acts as an air mass and forms a vibration system with one freedom degree for only air mass.

Cylindrical extensions 43 protruding from the edge portions of the holes 37a and 37b and having the same cross-section as that of the holes 37a and 37b are provided between the noise insulating plates 29a and 29b, so that they face to each other. The holes 37a and 37b are not communicated with the cylinder 39. Thus, the extended hole portions 40 and 40 facing to each other are formed on the noise insulating plates 29a and 29b, respectively. The extended hole portion 40 is longer than the thickness of the noise insulating plate 29a or 29b. Further, space 42 is formed around the extensions 43, between the noise insulating plates 29a and 29b.

Figure 8A:
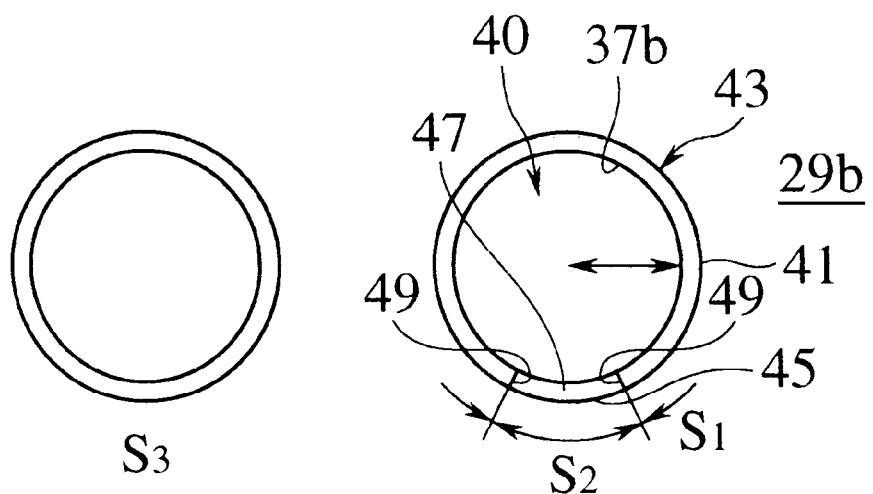
FIGS. 8(a) and 8(b) are a plan view of the wall portion and an opening of the extension, and a side view thereof respectively.

As shown in FIG. 7, a substantially rectangular opening 45 is formed in a wall portion 41 of the extension 43, so that it is directed from the top edge 43a of the wall portion 41 to the surface 30 of the noise insulating plate 29b. This opening 45 is defined by a cut-out bottom surface 47 arranged along the circumferential direction, and cut-out opposite side surfaces 49 and 49 extending to the top edge 43a of the extension 43. The cut-out bottom surface 47 is x in height from the surface of the noise insulating plate 29b. Further, the opposite side surfaces 49 and 49 are formed along the radial direction of the hole 37b, as shown in FIG. 8(a). The air in the extended hole portions 40 and 40 act as an air mass, and the air layer of the space 42 acts as an air spring to form a vibration system with two freedom degree.

Noise or sound emitted from the sound source in the engine room, such as an oil pan or the like is transmitted through a noise insulating wall by way of the vibration system with two freedom degrees and the vibration system with one freedom degree to be emitted out of the car. The transmitted wave from the vibration system with two freedom degrees has a characteristic in which the phase of the transmitted wave is inverted in a frequency band having a frequency larger than the resonance frequency. Accordingly, the phase of the transmitted wave from the vibration system with two freedom degrees is contrary to the transmitted wave from the vibration system with one freedom degree, and the phases are canceled to each other, whereby the noise insulating effect can be obtained.

In this case, water entered between the noise insulating plates 29a and 29b, through the holes 37a and 37b of the noise insulating plates 29a and 29b and through the inside of the wall portion 41 is discharged outside through the opening 45. In this embodiment, water is collected to a height x from the surface 30 of the noise insulating plates 29b, and water accumulated over the height x is discharged outside through the opening 45. Therefore, the volume between the noise insulating plates 29a and 29b is reduced and the air mass between the noise insulating plates 29a and 29b is decreased, so that the resonance frequency for the vibration system with two freedom degrees is increased.

Figure 8B:
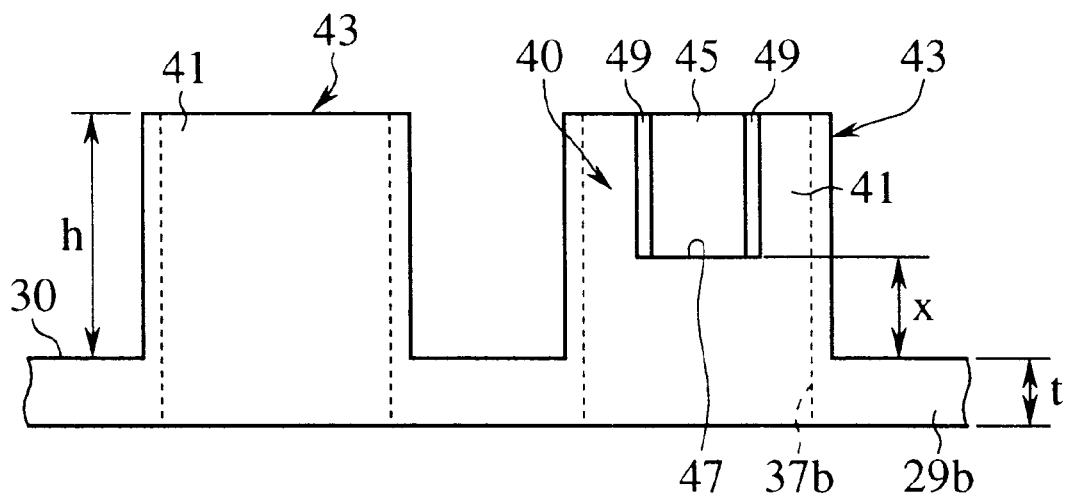

The resonance frequency $f_0$ for the vibration system with two freedom degrees is expressed by the following expression, in a case where water is collected to the height x from the surface 30 of the noise insulating plates 29b, and a frequency band of f0 or more becomes a noise insulating region.

$$f_0 = \frac{c}{2\pi}\sqrt{\frac{2\alpha(1-\beta)}{(1-\alpha\beta)(t+h+\delta\ a)(d-x)}}$$

wherein c is the speed of sound;

α is an opening ratio of the area of the hole portions 35a, 35b, 37a and 37b to the area of the noise insulating wall;

β is a ratio of the area of the hole portions 35a and 35b to the area of the whole hole portions 35a, 35b, 37a and 37b;

t is a plate thickness of the respective noise insulating plates 29a and 29b (see FIG. 8(b));

h is the length of the protruded extension 43 (see FIG. 8(b));

a is the radius of the hole portions 37a and 37b (see FIG. 8(b));

δ is the compensated value at the edge of the hole portion; and d is the distance between the noise insulating plates 29a and 29b facing to each other.

The compensated value δ is changed by the shape, size or the like of the hole portions 37a and 37b, and usually takes values ranging from 0.5 to 1.6.

The main frequency band of the car outside noise, which the noise insulating wall 27 of this embodiment insulates is different in accordance with automobiles, but substantially takes 800 Hz to 2 KHz. In this case, the frequency band having the resonance frequency $f_0$ or more for the vibration system with two freedom degrees becomes a noise insulating region in a case where water is accumulated between the noise insulating plates 29a and 29b. Thus, resonance frequency $f_0$ is smaller than 800 Hz, that is, if the frequency f for noise insulation has the following relation to the resonance frequency $f_0$: f>$f_0$, even though water enters between the noise insulating plates 29a and 29b and the volume of air layer between the noise insulating plates 29a and 29b is changed to increase the resonance frequency, so that a noise insulating region is narrowed, there is the main frequency band of the car outside noise in the noise insulating region. Therefore, the noise insulating effect on the car outside noise is not changed.

If the shortest distance x between the opening 45 and the surface of the noise insulating plate 29b exists within the range which is satisfied by the following expression, deterioration of the noise insulating performance can be prevented:

$$f > \frac{c}{2\pi} \sqrt{\frac{2\alpha(1-\beta)}{(1-\alpha\beta)(t+h+\delta a)(d-x)}}$$

wherein f is a noise frequency;

c is the speed of sound;

α is an opening ratio of the area of the hole portion to the area of the noise insulating wall;

β is a ratio of the area of the noise insulating wall structure to the area of the whole hole portions 35a, 35b, 37a and 37b;

t is a plate thickness of the respective noise insulating plates 29a and 29b, as shown in FIG. 8(b);

h is the length of the protruded extension 43;

a is the radius of the respective hole portions 37a and 37b;

δ is the compensated value at the edge of the respective hole portions 37a and 37b; and d is the distance between the noise insulating plates 29a and 29b.

Although the opening 45 is provided in the extension 43, the air layer of the space 42 between the noise insulating plates 29a and 29b, which forms an air spring does not comes into contact with the outer space directly, and substantially forms an air mass in the extended hole portion 40. Therefore, the air layer also acts as an air spring.

Further, the air mass in the extended hole portion 40 acts as an air mass consisting of not only the air in the extended hole portion 40 but also entrained circumferential air adjacent to the air in the hole 37b. Accordingly, if the size of the opening 45 is within a desired size, action of the air mass is not changed greatly. However, As the opening 45 becomes large, the air mass in the wall portion 41 becomes small.

Figure 9:
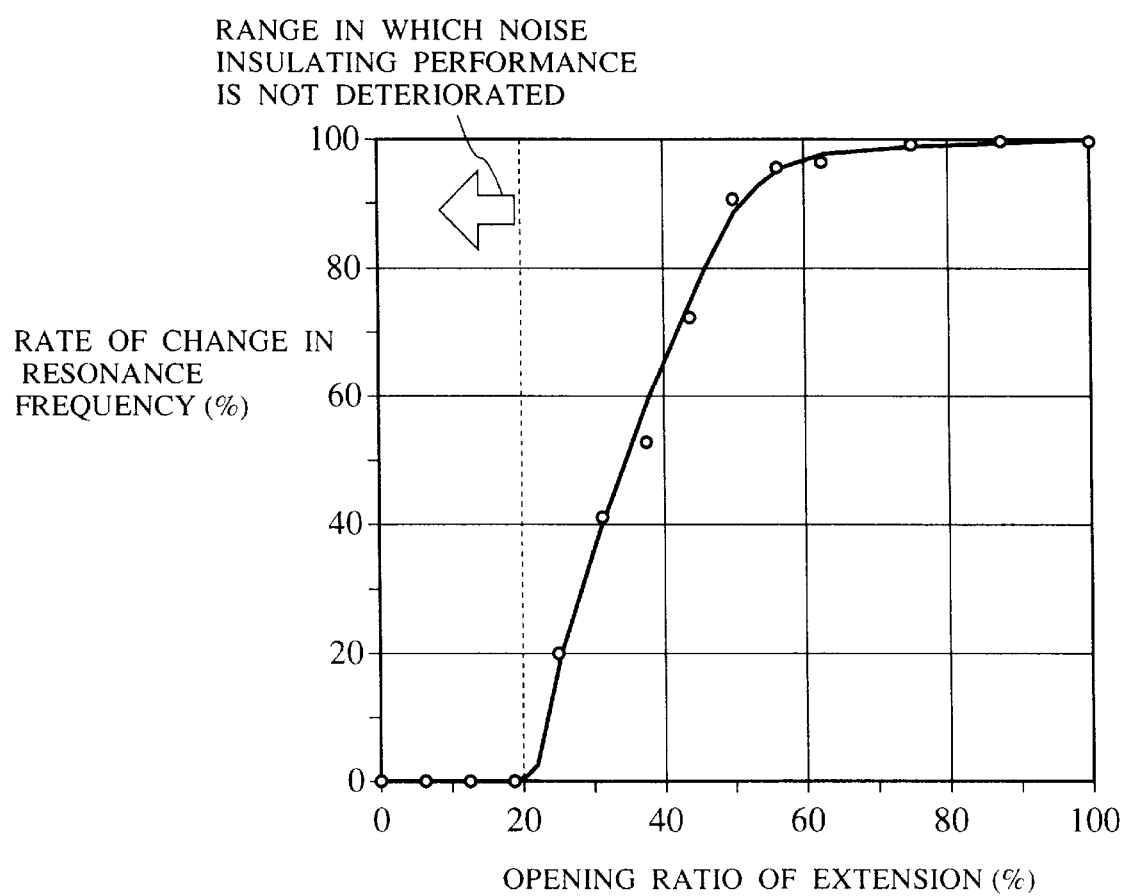
FIG. 9 is a diagram showing the relationship between the rates of change in the resonance frequency and the opening ratios of the extension, in the noise insulating wall structure according to the first embodiment of the present invention.

The size of the opening 45 and action of the air mass, that is the noise insulating performances will experimentally be examined, hereinbelow. FIG. 9 is a graph showing a relationship between a ratio of the area of the opening 45 to the whole circumferential area of the protruded extension 43 containing the area of the opening 45 (hereinafter referred to as an opening ratio of the extension) and the rates of change of the resonance frequency for the vibration with two freedom degrees. In this case, as shown in FIG. 8(a), the ratio S2/(S1+S2+S3) of the area S2 of the outer circumferential portion of the opening 45 to the whole area (S1+S2+S3) of the outer circumferential side walls of both wall portions (containing the area of the opening) of the extensions 43 having an opening and no opening is referred to as an opening ratio of the extension.

The curve in FIG. 9 shows the rates of change in the resonance frequency to the above-mentioned opening ratios. The rates δ $f_1$ of change in the resonance frequency are expressed by the following expression using a resonance frequency $f_1$ (δ s) when the opening ratio of the extension is δ s.

$$\delta f_1(\delta s) = \frac{f_1(\delta s) - f_1(0)}{f_1(100) - f_1(0)} \times 100$$

In this expression, a case where the opening ratio of the expression is 100% corresponds to a case where the extension 43 is not provided at the hole 37b of the noise insulating plate 29b positioned on the lower side, or a case where an air mass in the hole 37b based on the thickness of the noise insulating plate 29b exists. On the other hand, a case where the opening ratio of the expression is 0% corresponds to a case where the opening 45 is not provided in the extension 43.

As shown in FIG. 9, when the opening ratio of the extension is 20% or less, the rate of change in the resonance frequency is substantially 0%, and the resonance frequency for the vibration system with two freedom degrees is not almost changed. On the other hand, when the opening ratio of the extension exceeds 20%, the rate of change in the resonance frequency is rapidly increased, and the resonance frequency for the vibration system with two freedom degrees is also rapidly increased.

Therefore, when the opening 45 is formed in the wall portion, if the opening ratio of the extension is set to a value of 20% or less, the resonance frequency for the vibration system with two freedom degrees is almost unchanged, and the noise insulating region is not narrowed. Accordingly, the noise insulating performance is almost unchanged.

In this embodiment, when the opening 45 is formed, the cut-out opposite side surfaces 49 and 49 are formed along the radial direction of the hole 37a. Thus, even though any portion of the side surfaces 49 and 49 of the wall portion 41 forms an opening 45, the opening ratios of the extension are the same values. Namely, as shown in FIG. 8(a), circumference directional distances between the opposite surfaces 49 and 49 are different in the direction of the wall thickness of the wall portion 41, the distance therebetween, which is along the inner circumference surface is the shortest therein, and the distance therebetween, which is along the outer circumference surface is the longest. However, even though any portion in the direction of the wall thickness of the wall portion 41 is formed as an opening, the ratio of the area of the opening to the circumferential area of the wall portion 41 including the area of the opening is defined as the opening ratio of the extension. Thus, even though any portion in the direction of the wall thickness of the wall portion 41 is formed as an opening, the opening ratios of the extension become the same values.

In this connection, when the cut-out opposite side surfaces 49 and 49 of the opening 45 are formed so as to be along the direction parallel to the diameter of the hole 37a, the circumference directional distances between the opposite side surfaces 49 and 49 are the same in the direction of the wall portion thickness of the wall portion 41. In this case, the ratio of the area of the opening 45 to the outer circumferential surface area of the wall portion 41 containing the area of the opening 45 is defined as the opening ration of the extension.

Next, the operation of the noise insulating wall 27 of the present embodiment will be described.

A transmitted wave transmitted through a vibration system with one freedom degree which is composed of an air layer in the continuous hole portion 38 and an air layer between the surface of sound source and the noise insulating plate 29a has the same phase as that of an incident wave. On the other hand, in a vibration system with two freedom degrees which is composed of an air layer in the extended hole portion 40 and an air layer between the surface of sound source and the noise insulating plate 29a, the phase of the incident wave is opposite to that of the transmitted wave.

Therefore, in this embodiment, when noises which are emitted from the engine room enters the under cover 5, the incident waves are transmitted as transmitted waves having the same phases, in the vibration system with one freedom degree. On the other hand, in the vibration system with two freedom degrees, the incident waves are transmitted through the under cover 5 with a deviation of 180° by exceeding the resonance frequency. As a result, the transmitted waves respectively transmitted through the vibration system with one freedom degree and the vibration system with two freedom degrees have phases opposite to each other and are mutually canceled, whereby the noise insulating effects can be obtained.

Water which has entered between the noise insulating plates 29a and 29b through the hole 37b of the noise insulating plate 29b positioned on a lower side, and through the extension 43 is discharged outside through the opening 45 in the wall portion 41 of the extension 43. In this case, the opening 45 is provided at a position which is x in height from the surface of the noise insulating plates 29b. Thus, water in excess of the height x is discharged out over the cut-out bottom surface 47 of the opening 45.

Since the shortest distance x between the bottom surface 47 of the opening 45 and the surface of the noise insulating plate 29b is set in a range which satisfies the above-explained expression (1), even though water enters the noise insulating wall 27, and accumulates to a level of the height x, so that the volume of the air layer between the noise insulating plates 29a and 29b is changed to increase the resonance frequency, the main frequency band for the car outside noise exists in a noise insulating region, the noise insulating effect on the car outside noise is not changed.

Further, since the opening is provided in the wall portion 41 in a manner that the ratio of the area of the opening 45 to the area of the protruded extension 43 containing the area of the opening 45 is 20% or less, the resonance frequency for the vibration system with two freedom degrees is almost unchanged, and also the insulating performance is almost unchanged.

As described above, according to the present embodiment, by provision of the opening 45 in the wall portion of the extension 43, both mass spring systems of the vibration system with one freedom degree which is formed of the air layer in the continuous hole portion 38 and the air layer between the sound source and the noise insulating plate 29a, and of the vibration system with two freedom degrees which is formed of the air layer in the extended hole portion 40 and the air layer between the noise insulating plates 29a and 29b are not acoustically broken. Thus, while maintaining the noise insulating performance, the water which has entered between the noise insulating plates 29a and 29b can be discharged. In this case, without carrying out a composite readjustment of the vibration system, the water can be discharged by means of a simple control.

Further, according to the present embodiment, by provision of the opening 45 in an extension 43 which is positioned at at least the lowest side, among a plurality of extensions 43, the water between the noise insulating plates 29a and 29b is collected at the lowest position and discharged from the opening 45. Accordingly, improved water dischargeability can be obtained and changes of the noise insulating performance can be suppressed to a small extent.

Further, according to the present embodiment, the shortest distance x between the bottom surface 47 of the opening 45 and the surface of the noise insulating plate 29b is set in a range which satisfies the above-explained expression (1), with respect to the sound frequency f for insulation of the noise. Accordingly, the sound frequency for insulation of the noise becomes larger than the resonance frequency for the vibration system with two freedom degrees, and then, the noise insulating performance can be maintained.

Further, according to the present, since the opening 45 is provided in the wall portion 41 in a manner that the opening ratio is 20% or less, the rate of change in the resonance frequency for the vibration system with two freedom degrees which is formed of an air spring of the air layer between the noise insulating plates 29a and 29b and an air mass in the extension 43 is small, and the resonance frequency is almost unchanged. Thus, also the insulating performance is almost unchanged, and the water accumulated between the noise insulating plates 29a and 29b can be discharged while maintaining the noise insulating performance.

Further, according to the present embodiment, since the continuous hole portion 38 and the extended hole portion 40 are formed in the under cover 5, the gas permeability can be ensured, and the hot air in the engine can easily be discharged. At the same time, the noise insulating wall according to the embodiment functions as a part of the under cover 5, and has a function to protect the parts in the engine room from splashed pebbles or the like, and enhances, the aerodynamic characteristics of the lower portion of the automobile.

Further, according to the present embodiment, by formation of the opening 43 in a substantially rectangular slit-shape, the cylindrical wall portion 41 can be formed more in the circumferential direction than in the vertical direction. As a result, the effect of the opening 45 on the air mass of the air layer in the extension 40 is reduced. Further, since the portions connecting the wall portion 41 to the noise insulating plate 29b are increased, the wall portion 41 can rigidly be formed on the noise insulating plate 29b.

Further, according to the present embodiment, since extensions 43 are provided at the holes 37a and 37b, respectively, and then, the air mass of the holes 37a and 37b are increased, the resonance frequency of the vibration which is formed by the air layer in the holes 37a and 37b is reduced. Therefore, the noise insulating wall 27 of this embodiment can obtain the noise insulating effects from lower frequencies.

Additionally, by respective provisions of the openings 43 for a plurality of extensions 43, water accumulated between the noise insulating plates 29a and 29b can promptly be discharged, and the water dischargeability can be enhanced.

Other embodiments will be described hereinbelow. The same components as those described in the first embodiment will be described by using the same reference numerals, and the overlapped explanations are omitted.

Second Embodiment

Figure 10:
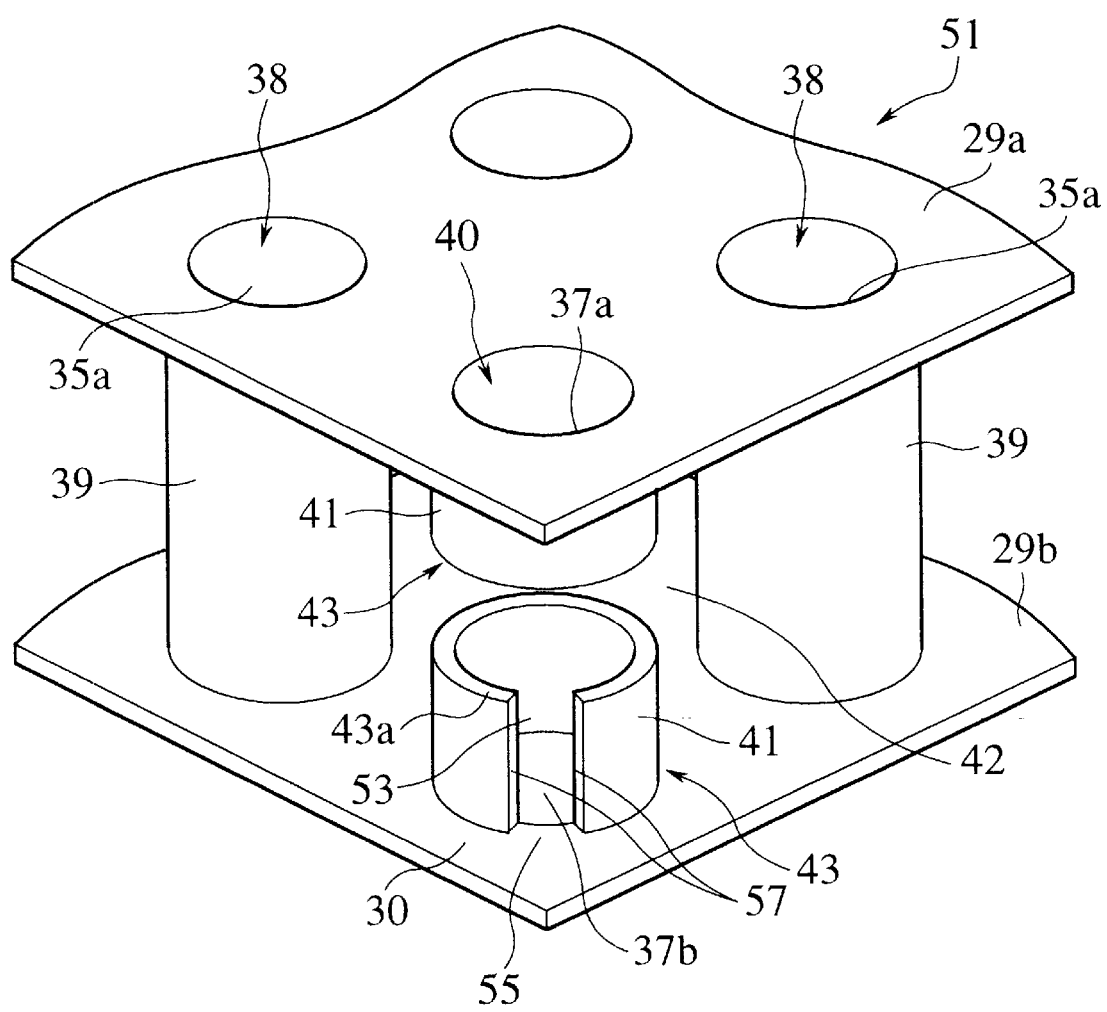
FIG. 10 is a partially enlarged perspective view of the noise insulating wall structure according to a second embodiment of the present invention.

FIG. 10 shows a noise insulating wall 51 of the second embodiment. In the noise insulating plate 51 of the present embodiment, an opening 53 which extends from the surface of the noise insulating plate 29b to the top edge 43a of the extension 43 is provided in the wall portion 41 of the extension 43, along the axial direction of the extension 43. The opening 53 is formed of the opening edge 55 of the hole 37a and cut-out opposite side surfaces 57 and 57, in a substantially rectangular slit-shape. The opposite side surfaces 57 and 57 are formed along the radial direction of the hole 37b.

The opening ratio of the extension for the opening 53 is set to 20% or less, which is the same as in the first embodiment.

The opening 53 of this embodiment is an example in a case where the shortest distance x between the bottom surface 47 of the opening 45 and the surface of the noise insulating plate 29b is zero. Thus, since water is not collected between the noise insulating plates 29a and 29b, the volume of the air layer between the noise insulating plates 29a and 29b is not changed.

According to the present embodiment, transmitted waves transmitted through the vibration system with one freedom degree have the same phases respectively, and transmitted waves transmitted through the vibration system with two freedom degrees have opposite phases to each other, as described in the first embodiment, whereby in noises from the engine room 3, transmitted waves transmitted through the vibration system with one freedom degree and the vibration system with two freedom degrees have phases opposite to each other and are mutually canceled. As a result, the noise insulating effects can be obtained. Further, since the continuous hole portion 38 and the extended hole portion 40 are formed in the under cover 5, the gas permeability can be ensured, and the hot air in the engine can easily be discharged outside. At the same time, the noise insulating wall according to the present embodiment functions as a part of the under cover 5, and has a function to protect the parts in the engine room from a splashed stones or the like, as well as enhancing, the aerodynamic characteristics of the lower portion of the automobile.

Water which has entered between the noise insulating plates 29a and 29b through the hole 37b of the noise insulating plate 29b positioned on a lower side, and through the extension 43, because of water splashing while driving through puddles, is discharged outside through the opening 45 in the wall portion 41 of the extension 43. In this case, the noise insulating wall 51 of this embodiment has the same effects as in the above-mentioned first embodiment. Further, the noise insulating wall of this embodiment can completely discharge water entered between the noise insulating plates 29a and 29b, and then, water is not collected between the noise insulating plates 29a and 29b. Therefore, the volume of the air layer between the noise insulating plates 29a and 29b is not changed. Thus, the resonance frequency for the vibration system with two freedom degrees is not increased, and deterioration of the noise insulating performances can be suppressed to a minimum.

Further, water entered between the noise insulating plates 29a and 29b is not collected therebetween. As a result, a nasty smell derived from decayed water or a noise of water splashed between the noise insulating plates 29a and 29b, or the like can positively be prevented.

Third Embodiment

Figure 11:
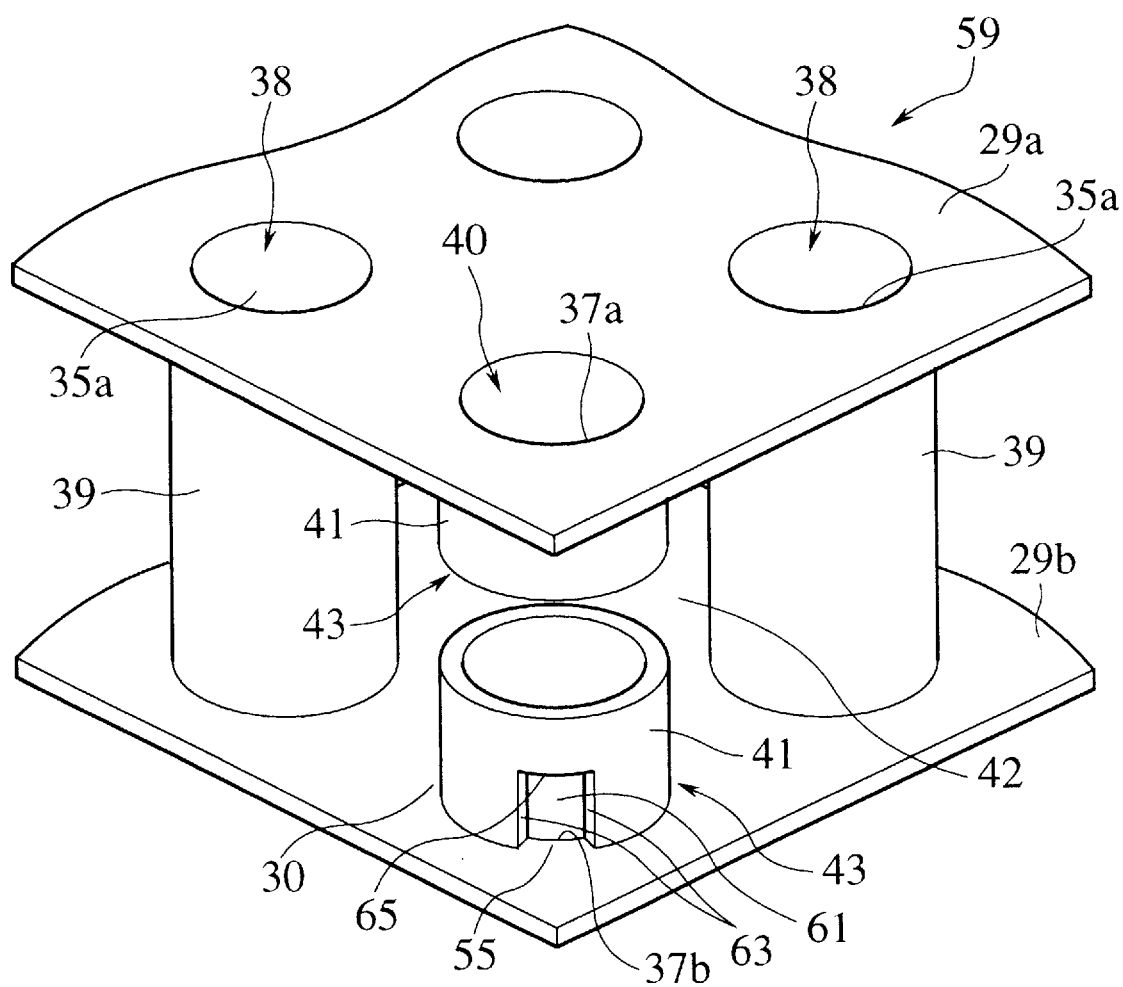
FIG. 11 is a partially enlarged perspective view of the noise insulating wall structure according to a third embodiment of the present invention.

FIG. 11 shows a noise insulating wall 59 of the third embodiment. In the noise insulating wall 59 of the present embodiment, an opening 61 which extends from the surface of the noise insulating plate 29b to the intermediate portion of the wall portion 41, which is in the axial direction thereof is provided in the wall portion 41 of the extension 43. The opening 61 is formed of the opening edge 55 of the hole 37b, cut-out opposite side surfaces 63 and 63 extending along the axial direction of the wall portion 41, and cut-out top surface 65 connected to the upper edges of the surfaces 63 and 63, in a substantially rectangular slit shape. The opposite side surfaces 63 and 63 are formed along the radial direction of the hole 37b.

The opening 61 of this embodiment is an example in a case where the shortest distance x between the bottom surface 47 of the opening 45 and the surface of the noise insulating plate 29b is zero. Thus, since water is not collected between the noise insulating plates 29a and 29b, the volume of the air layer between the noise insulating plates 29a and 29b is not changed. The opening ratio of the extension for the opening 61 is set to 20% or less, which is the same as in the first and second embodiments.

According to the present embodiment, transmitted waves transmitted through the vibration system with one freedom degree have the same phases respectively, and transmitted waves transmitted through the vibration system with two freedom degrees have opposite phases to each other, as described in the first and second embodiments, whereby in noises emitted from the engine room 3, transmitted waves transmitted through the vibration system with one freedom degree and the vibration system with two freedom degrees have phases opposite to each other and are mutually canceled. As a result, the noise insulating effects can be obtained. Further, since the continuous hole portion 38 and the extended hole portion 40 are formed in the under cover 5, the gas permeability can be ensured, and the hot air in the engine can easily be discharged outside. At the same time, the noise insulating wall according to the present embodiment functions as a part of the under cover 5, and has a function to protect the parts in the engine room, and enhance, the aerodynamic characteristics of the lower portion of the automobile.

Water which has entered between the noise insulating plates 29a and 29b through the hole 37b of the noise insulating plate 29b positioned on a lower side, and through the extension 43, by water splashing or the like at a drive across puddles is discharged outside through the opening 61 in the wall portion 41 of the extension 43. In the noise insulating wall 59 of this embodiment water can be completely discharged. Therefore, the volume of the air layer between the noise insulating plates 29a and 29b is not changed. Thus, the resonance frequency for the vibration system with two freedom degrees is not increased, and deterioration of the noise insulating performances can be suppressed to a minimum.

Further, water is not collected between the noise insulating plates 29a and 29b is not collected therebetween. As a result, a nasty smell or noise of water splashing between the noise insulating plates 29a and 29b, or the like can positively be prevented.

Further, the third embodiment has the same effects as those in the first and second embodiments. If the area of the opening 61 of the third embodiment is the same as that of the opening 45 or 53 of the first or second embodiment, the size of width of the opening 61, which is along the circumferential direction of the wall portion 41, can be increased. As a result, water on the noise insulating plate 29b can be discharged outside at once, and water dischargeability can be further enhanced than in the first and second embodiment.

Fourth Embodiment

Figure 12:
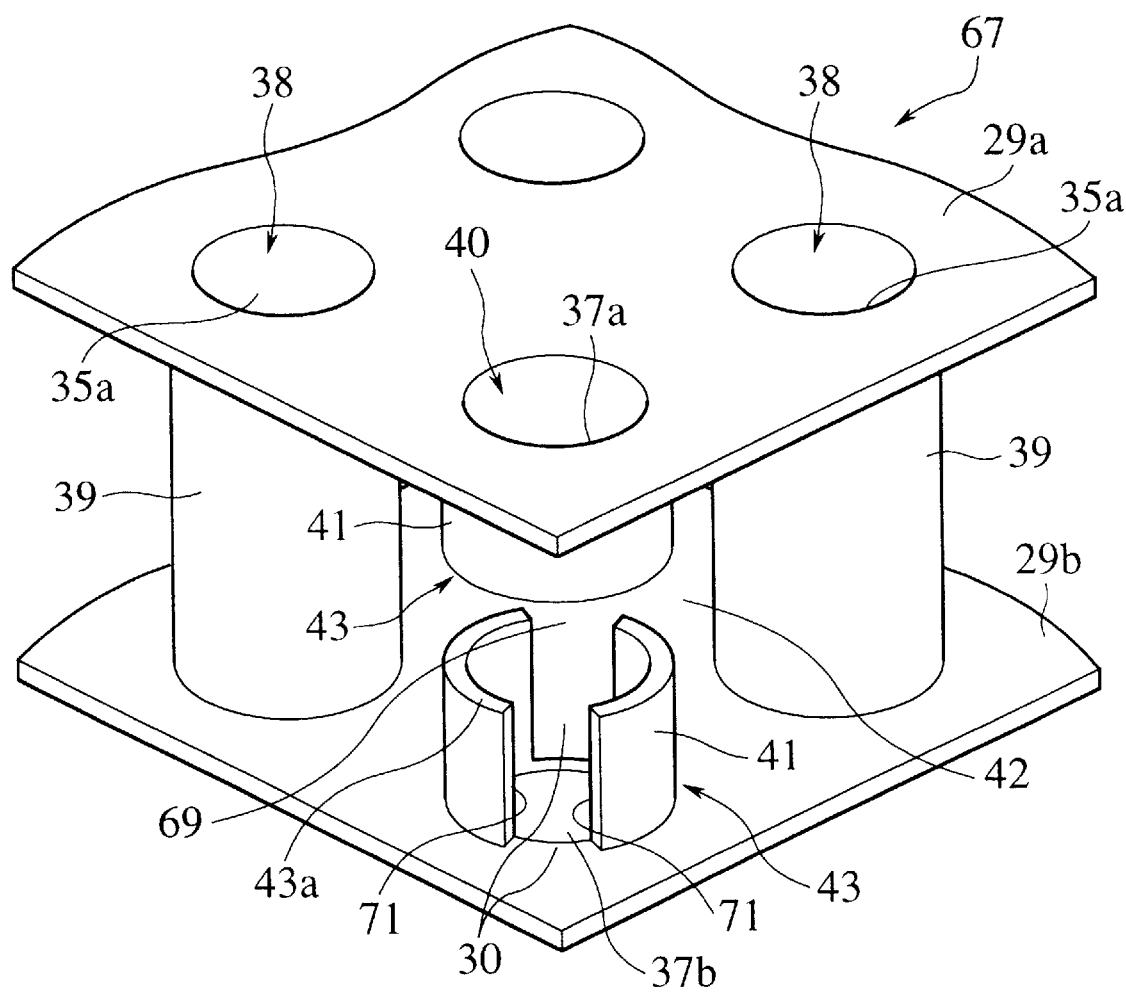
FIG. 12 is a partially enlarged perspective view of the noise insulating wall structure according to a fourth embodiment of the present invention.

FIG. 12 shows a noise insulating wall 67 of the fourth embodiment. In the noise insulating plate 67 of the present embodiment, two openings 69 and 69, each having the same shape as that of the opening 53, are opposingly provided in the wall portion 41. The opening 69 is formed of the opening edge 55 of the hole 37b, and cut-out opposite side surfaces 71 and 71 extending along the axial direction of the wall portion 41, in a substantially rectangular slit shape. The opposite side surfaces 71 and 71 are formed along the radial direction of the hole 37b.

In this case, the opening ratio of the extension for these openings 69 and 69 is obtained by the ratio of the area of the openings 69 and 69 to the outer circumferential surface area of the wall portion 41 including the area of the openings 69 and 69. The opening ratio is set to 20% or less.

The openings 69 and 69 of this embodiment is an example in a case where the shortest distance x between the bottom surface 47 of the opening 45 and the surface of the noise insulating plate 29b is zero. Thus, since water is not collected between the noise insulating plates 29a and 29b, the volume of the air layer between the noise insulating plates 29a and 29b is not changed.

According to the present embodiment, transmitted waves transmitted through the vibration system with one freedom degree have the same phases respectively, and transmitted waves transmitted through the vibration system with two freedom degrees have opposite phases to each other, as described in the first and second embodiments, whereby in noises from the engine room 3, transmitted waves transmitted through the vibration system with one freedom degree and the vibration system with two freedom degrees have phases opposite to each other and are mutually canceled. As a result, the noise insulating effects can be obtained. Further, since the continuous hole portion 38 and the extended hole portion 40 are formed in the under cover 5, the gas permeability can be ensured, and the hot air in the engine can easily be discharged outside. At the same time, the noise insulating wall according to the present embodiment functions as a part of the under cover 5, and has a function to protect the parts in the engine room from a stones or the like. The aerodynamic characteristics of the lower portion of the automobile can be enhanced.

Water entering the noise insulating plates 29a and 29b through the hole 37b of the noise insulating plate 29b positioned on a lower side, and through the extension 43, is discharged outside through the openings 69 and 69 in the wall portion 41 of the extension 43.

According to the fourth embodiment, the same effects can be obtained. Further, since, in this embodiment, two openings 69 and 69 are oppositely formed, the water dischargeability is further enhanced in comparison with the above-mentioned first, second and third embodiments.

In this case, the air mass in the extended hole portion 40 for the noise insulating plate 29b acts as an air mass consisting of not only the air in the extended hole portion 40 but also entrained circumferential air adjacent to the air in the hole 37b. Thus, when one opening 69 is formed in the wall portion 41 of the extension 43, the gravity center of the air mass is shifted from the center of the wall portion 41 to the opening 69 side, and the vibration of the air mass is off-centered. However, since, in this embodiment, two openings 69 and 69 are provided at an opposite position, the center of gravity of the air mass is not shifted from the center of the wall portion 41, and the air mass is not off-centered, whereby the air mass can effectively be formed. As a result, an increase of the resonance frequency can be suppressed to a small extent, and also, a deterioration of the noise insulating effects can be decreased.

In this embodiment, an example in which two openings 69 and 69 are oppositely provided in the wall portion 41 of the extension 43 has been described. Nevertheless, by provision of three or more openings in the wall portion 41, the same effects as in this embodiment can be obtained, and the water dischargeability can further be enhanced than in the second embodiment. Further, in the case where three or more openings are provided, if they are provided at regular intervals in the circumferential direction, off-centering of the vibration of the air mass does not occur and the air mass can effectively be formed.

Further, in this embodiment, an example in which two openings 69 and 69 having the same shape thereof as in the above-mentioned second embodiment are oppositely provided in the wall portion 41 of the extension 43 has been described. Nevertheless, even though two or more openings 45 in the first embodiment, or two or more openings 61 in the third embodiment are opposingly provided in the wall portion 41 of the extension 43, the same effects can be obtained.

Although in the above-mentioned each embodiment, the noise emitted from the engine room 3 has been insulated by forming two vibration systems, a plurality of vibration systems can be formed by changing the diameters of the cylinder 39, holes 35a, 35b, 37a and 37b.

Further, in the above-mentioned each embodiment, an example has been described, in which the present invention is applied to a noise insulating wall that insulates noises by canceling the transmitted wave transmitted through a vibration system with one freedom degree by the transmitted wave transmitted through a vibration system with two freedom degrees, the latter transmitted wave having an opposite phase to the former transmitted wave. Nevertheless, the present invention can be applied to a noise insulating wall structure that can insulate noises by using the damping effect of vibration systems having different resonance frequencies.

Further, in the above-mentioned each embodiment, an example of the noise insulating wall 27 consisting of two noise insulating plates 29a and 29b has been described. Nevertheless, the present invention can be applied to a noise insulating wall which is formed of three or more noise insulating plates.

As described above, according to the present invention, the transmitted wave transmitted through the vibration system with one freedom degree formed of the air in the cylinder and in the hole communicated to the cylinder is canceled by the transmitted wave transmitted through the vibration system with two freedom degrees formed of the air between the noise insulating plates, the latter transmitted wave having the opposite phase to the former transmitted wave. As a result, noises from the surface of the sound source can be insulated.

Further, according to the present invention, since a plurality of holes are formed in the noise insulating plate, the gas permeability can be ensured.

Further, according to the present invention, water entering the noise insulating plates through the holes provided therein is discharged outside from the opening, water is not collected between the noise insulating plates. Thus, since the volume of the air layer between the noise insulating plates is not changed, the noise insulating performance is not deteriorated. Further, in this case, water entered into the periphery of the extension can easily be discharged outside without a complex control of the vibration system.

Therefore, water entered between the noise insulating plates can positively be discharged outside by a simple control, while maintaining the noise insulating performance.

Further, according to the present invention, since the opening is provided in the extension which is arranged at the lowest position side from the ground at the use thereof, water entered between the noise insulating plates is collected at the lowest position therebetween, and is effectively discharged through the opening.

Further, according to the present invention, since the shortest distance x between the bottom surface of the opening and the surface of the noise insulating plate is set in a range which satisfies the above-mentioned expression (1), with respect to the frequency f for the noise insulation, the frequency for the noise insulation is larger than the resonance frequency for the vibration with two freedom degrees. Thus, the noise insulation performance is not deteriorated.

According to the present invention, since a plurality of openings are provided in one protruded extension, water entered between the noise insulating plates is promptly discharged outside.

Further, according to the present invention, since openings are opposingly provided respectively, when the air layer inside the wall portion acts as the air mass, the vibration of the air mass is not off-centered, whereby the air mass is effectively formed.

Further, according to the present invention, since the opening of the extension is provided so that the ratio of the area of the opening to the whole circumferential area of the extension including the area of the opening is 20% or less, the rate of change in the resonance frequency for the vibration system with two freedom degrees consisting of an air spring generated by the air layer between the noise insulating plates and an air mass in the extension is small, and the resonance frequency is not almost changed. As a result, the noise insulating performance is not almost changed.

Further, according to the present invention, since the opening is formed in substantially rectangular shape, the extension having a large circumferential area can be connected to the noise insulating wall, and it can rigidly formed on the noise insulating plate.

Further, according to the present invention, since the opening is formed from the top end of the extension to the surface of the noise insulating plate, water and mud entered between the noise insulating plates can positively discharged outside.

Further, according to the present invention, since the opening is formed from the surface of the noise insulating plate to an intermediate portion of the extension, water and mud entered between the noise insulating plates can positively discharged outside.

Additionally, according to the present invention, the noise insulating wall structure can be applied to an under cover of the engine room of the automobile, and the noise insulation can be carried out while maintaining the gas permeability.

What is claimed is:

1. A noise insulating wall structure comprising:

two spaced noise insulating plates which define a space therebetween;

a plurality of holes penetratingly provided in said noise insulating plates so as to face each other in pairs;

a first number of the pairs of holes being communicated with one another by a corresponding number of straight tubes, and a second number of the pairs of holes each having an extension wall portion extending into the space and toward an opposite noise insulating plate;

an opening formed in a selected extension wall portion to communicate the space with one of the plurality of holes to drain water from the space; and wherein x exists within the range which is satisfied by the following expression:

$$f > \frac{c}{2\pi} \sqrt{\frac{2\alpha(1-\beta)}{(1-\alpha\beta)(t+h+\delta a)(d-x)}} \quad (1)$$

wherein:

x is the shortest distance between said opening and a surface of a nearest noise insulating plate;

f is a frequency of the noise to be attenuated;

c is the speed of sound;

α is an opening ratio of the area of said opening to the area of the noise insulating wall;

β is a ratio of the area of the first number of holes communicated by the cylinder portion to a total area of the holes;

t is a thickness of the noise insulating plates;

h is a length of the extension wall portions;

a is a radius of the holes associated with the extension wall portions;

δ is a compensated value at an edge of the holes; and d is a distance between the noise insulating plates.

2. A noise insulating wall structure according to claim 1, wherein said opening is provided in the extension so as to be on a lowest position side in a state of use.

3. A noise insulating wall structure according to claim 1, further comprising a second opening provided in the selected extension wall portion.

4. A noise insulating wall structure according to claim 3, wherein the first said opening and the second opening are arranged so as to be opposite each other.

5. A noise insulating wall structure according to claim 1, wherein said opening is provided so that a ratio of an area of the opening to a total circumferential area of the selected extension wall portion including the area of the opening, is 20% or less.

6. A noise insulating wall structure according to claim 1, wherein said opening is a rectangular slit extending along selected extension wall portion.

7. A noise insulating wall structure according to claim 1, wherein said opening is formed in a portion of the selected extension wall portion ranging from a top end thereof to a surface of an associated noise insulating plate.

8. A noise insulating wall structure according to claim 1, wherein said opening is formed so as to extend from a noise insulating plate to an intermediate portion of the selected extension wall portion.

9. A noise insulating wall structure according to claim 1, wherein one of said two noise insulating plates forms at least a part of an under cover of an engine room of an automobile.

10. A noise insulating wall structure interposed between a first space which is exposed to a sound source and a second space which is shielded from the sound source, the wall structure comprising:

a first sound-shielding wall (29a) facing the first space;

a second sound-shielding wall (29b) facing the second space;

a sound-shielding space (42) defined between the first and second spaces;

a tube element (39) which extends through the sound-shielding space (42), the tube element having a first end (35a) which is open to the first space and a second end (35b) which is open to the second space;

a first pipe element (43) having a base end (37a) which is open to the first space and a free end (43a) which opens into the sound-shielding space (43);

a second pipe element (43) having a base end (37b) which is open to the second space and a free end (43a) which is open to the sound-shielding space (42), the free end (43a) of the second pipe element (43) being located opposite to the free end (43a) of the first pipe element (43); and opening means (45, 53, 61, 69), provided through a pipe wall (41) of one of the first and second pipe elements (43), for controlling a sound-shielding frequency-characteristic of the wall body (27); and wherein:

the second pipe element (43) comprises a tubular cylindrical body (43) projecting from a predetermined region of the second sound-shielding wall (29b); and the opening means defines an opening (45, 53, 61, 69) in a side wall (41) of the tubular cylindrical body (43) for shielding sounds in a frequency range defined such that $$f > (c/2\pi)\sqrt{2\alpha(1-\beta)/(1-\alpha B)(t+h+\delta a)(d-x)},$$

where:
f is a frequency of the sounds to be shielded;
c is a sound speed;
x is a distance between the opening and the predetermined region;
α is an opening proportion of the wall body;
β is an opening ratio of the tube element to the wall body;
t is a thickness in the predetermined region of the second sound-shielding wall;
h is a projection length of the tubular cylindrical body;
a is an inside diameter of the tubular cylindrical body;
δ is a compensation factor; and
d is a distance between the predetermined region and the first sound-shielding wall.

11. A noise insulating wall structure according to claim 10, wherein the opening means (45, 53, 61, 69) is adapted to permit drainage of water in the sound-shielding space (42) directly to the second space under the influence of gravity.

12. A noise insulating wall structure according to claim 10, wherein:
the second sound-shielding wall (29b) is disposed under the first sound-shielding wall (29a);
the second sound-shielding wall (29b) has an inboard surface on an upside thereof; and
the opening means (45, 53, 61, 69) is provided in a base part of the second pipe element (43) and extends up from the inboard surface to define a drain hole (45, 53, 61, 69) for the drainage of water on the inboard surface.

13. A noise insulating wall structure according to claim 11, wherein the opening means comprises a plurality of openings (69) formed in the pipe wall (41).

14. A noise insulating wall structure according to claim 13, wherein the plurality of openings (69) are symmetrically arranged about an axis of the pipe wall (41).

15. A noise insulating wall structure according to claim 10, wherein the opening means (45, 53, 61, 69) has an open area not exceeding 20 percent of an outer circumferential area of the pipe wall (41).

16. A noise insulating wall structure according to claim 10, wherein the opening means comprises a rectangular slot (45, 53, 61, 69) formed in the pipe wall (41).

17. A noise insulating wall structure according to claim 10, wherein the opening means comprises an opening (45, 53, 61, 69) equivalent in length to an axial length of the pipe wall (41).

18. A noise insulating wall structure according to claim 10, wherein the opening means comprises an opening (53, 61, 69) having a side thereof defined with an upside of an associated one of the first and second sound-shielding walls (29a, 29b).

19. A noise insulating wall structure according to claim 10, wherein the wall body (27) defined a bottom region of an engine room of an automobile.

* * * * *